US 9,258,521 B2

(12) United States Patent
Cohen et al.

(10) Patent No.: US 9,258,521 B2
(45) Date of Patent: Feb. 9, 2016

(54) REAL-TIME ADVISOR SYSTEM WITH PROJECTED AUGMENTABLE ANNOTATIONS

(71) Applicant: GLOBALFOUNDRIES Inc., Grand Cayman (KY)

(72) Inventors: Benjamin M Cohen, Gilon (IL); Pavel Gurevich, Haifa (IL); Yoel Lanir, Haifa (IL); Ran Stone, Hod Hasharon (IL)

(73) Assignee: GLOBALFOUNDRIES Inc., Grand Cayman (KY)

( * ) Notice: Subject to any disclaimer, the term of this patent is extended or adjusted under 35 U.S.C. 154(b) by 180 days.

(21) Appl. No.: 13/887,382

(22) Filed: May 6, 2013

(65) Prior Publication Data

US 2014/0327725 A1 Nov. 6, 2014

(51) Int. Cl.
H04N 7/14 (2006.01)
(52) U.S. Cl.
CPC ..................................... *H04N 7/141* (2013.01)
(58) Field of Classification Search
CPC ............ H04N 7/14; H04N 7/18; G06F 15/16; G09G 5/00; H04W 4/00
USPC ............. 348/14.01–14.16; 455/3.01, 92, 352, 455/403, 404.1, 414.1, 420; 709/204, 227; 345/629, 8
See application file for complete search history.

(56) References Cited

U.S. PATENT DOCUMENTS

| 7,324,081 | B2 | 1/2008 | Friedrich et al. |
| 7,333,135 | B2 | 2/2008 | Foote et al. |
| 7,712,903 | B2 | 5/2010 | Shingu |
| 7,714,895 | B2 | 5/2010 | Pretlove et al. |
| 8,151,193 | B2 | 4/2012 | Hernacki et al. |
| 2003/0104806 | A1* | 6/2003 | Ruef et al. ...................... 455/422 |
| 2005/0278446 | A1* | 12/2005 | Bryant ........................... 709/227 |
| 2006/0119701 | A1* | 6/2006 | King ............................ 348/14.08 |
| 2010/0238194 | A1* | 9/2010 | Roach, Jr. ....................... 345/629 |
| 2012/0136371 | A1* | 5/2012 | Mendez .......................... 606/130 |
| 2014/0292999 | A1* | 10/2014 | Do et al. .................... 348/14.07 |

FOREIGN PATENT DOCUMENTS

WO 2009/112063 9/2009

OTHER PUBLICATIONS

Bottecchia et al., "A new AR interaction paradigm for collaborative teleassistance system: the POA", International Journal on Interactive Design and Manufacturing (IJIDeM), Feb. 2009, vol. 3, Issue 1, pp. 35-40.
Alem et al., "HandsOnVideo: towards a gesture based mobile AR system for remote collaboration", Recent Trends of Mobile Collaborative Augmented Reality Systems, pp. 135-148, 2011.

* cited by examiner

*Primary Examiner* — Melur Ramakrishnaiah
(74) *Attorney, Agent, or Firm* — Heslin Rothenberg Farley & Mesiti P.C.

(57) ABSTRACT

Machines, systems and methods for providing remote assistance, the method comprising establishing a communications session between a local user and a visitor over a communications network, wherein the local user is positioned in a local physical operating environment and the visitor is positioned in a remote location relative to the local physical operating environment; communicating audio or video data captured at the local physical operating environment to the visitor; and receiving, at the local physical operating environment, imaging data generated as a result of the visitor interacting with a visitor application running on a visitor computing device, wherein the imaging data is used to project, by way of a projector, a first image of one or more annotations created by the visitor onto a local physical work environment to assist the local user, wherein the projector is mounted on a mechanically articulated arm.

8 Claims, 4 Drawing Sheets

REAL-TIME ADVISOR SYSTEM WITH PROJECTED AUGMENTABLE ANNOTATIONS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to a real-time advisor system with projected augmentable annotations and video camera feedback, mounted on a remotely controlled articulated arm for the purposes of efficient remote assistance.

BACKGROUND

A human operator or user (e.g., a mechanic) working on an object (e.g., a jet engine) might need assistance in performing a task when he encounters a specific problem that he is not familiar with. A user may have the option of seeking remote assistance by making a voice call to an advisor that would guide him through the task. However, often it is difficult for the advisor to provide meaningful assistance without the advisor having a real-time view of the user's environment or the ability to directly point to details present in the user's environment. In order for the remote advisor to provide effective assistance, it is desirable that the remote advisor be able to see the user's working area and provide constructive instruction, including pointing to particular areas in the user's environment.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, machines, systems and methods for providing remote assistance are provided. The method may comprise establishing a communications session between a local user and a visitor over a communications network, wherein the local user is positioned in a local physical operating environment and the visitor is positioned in a remote location relative to the local physical operating environment; communicating audio or video data captured at the local physical operating environment to the visitor; and receiving, at the local physical operating environment, imaging data generated as a result of the visitor interacting with a visitor application running on a visitor computing device, wherein the imaging data is used to project, by way of a projector, a first image of one or more annotations created by the visitor onto a local physical work environment to assist the local user, wherein the projector is mounted on a mechanically articulated arm, wherein the mechanically articulated arm is controllable by the visitor, to allow the visitor to control positioning of the first image in the local physical work environment.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
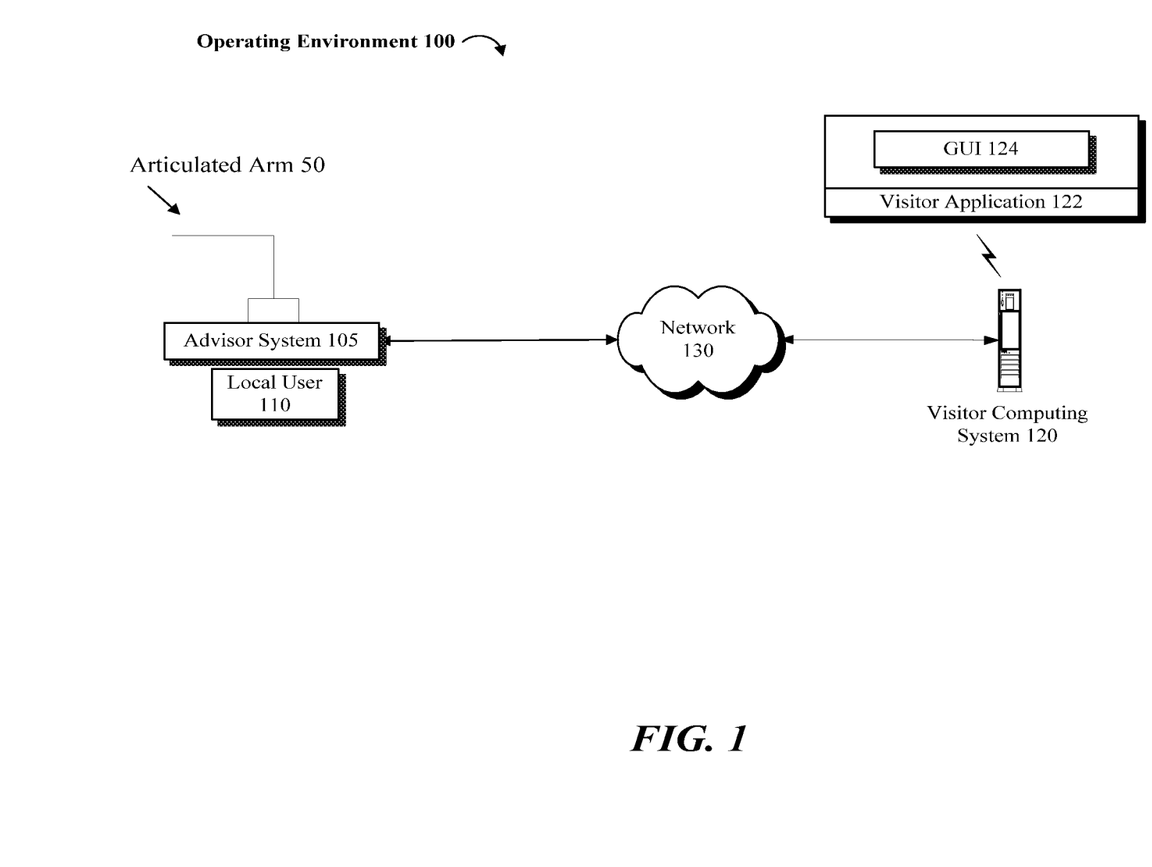
FIG. 1 illustrates an exemplary operating environment in accordance with one or more embodiments, wherein a remote visitor assists a local user by way of an advisor system.

Referring to FIG. 1, an operating environment 100 is provided in which an advisor system 105 comprising a robotic or articulated arm 50 may be positioned at a local user work environment. The articulated arm 50 is remotely controllable by one or more remote users (e.g., advisors or visitors) and may be equipped with an image capture device (e.g., a video camera) and a projection mechanism which when used in combination allow the remote user to help one or more local users 110 with accomplishing a task in the local user's work environment as supported by the components of the advisor system 105.

As shown, a remote assistance session may be established over network 130 between a local user 110 and a visitor computing system 120. A visitor application 122 and a graphical user interface (GUI) 124 may be provided on visitor computing system 120 to allow a visitor to view and manipulate the view of the local user's work environment (and ultimately the local user's work environment itself) by way of advisor system 105. A voice communication channel may be also established during the remote assistance session to allow the local user 110 and the visitor to verbally communicate. A camera (not shown) may be in operational relationship with (e.g., mounted on) the articulated arm 50. The camera may be used to capture images of the local user's physical work environment. The captured images may be communicated to the remote visitor over network 130, via a live video feed, for example.

In one embodiment, the remote visitor, having the benefit of the view of the local user's physical work environment via the video feed, is able to control the articulated arm and the position of the camera and the viewing angles, as well as having the capability to create and project annotations, a controllable pointer and images onto the user's local physical work environment by way of the projection mechanism, noted earlier. The ability to project the visitor generated annotations helps enhance the local user's understanding of the visitor's intent, as the local user receives verbal instructions from the remote visitor over the established voice session.

Figure 2:
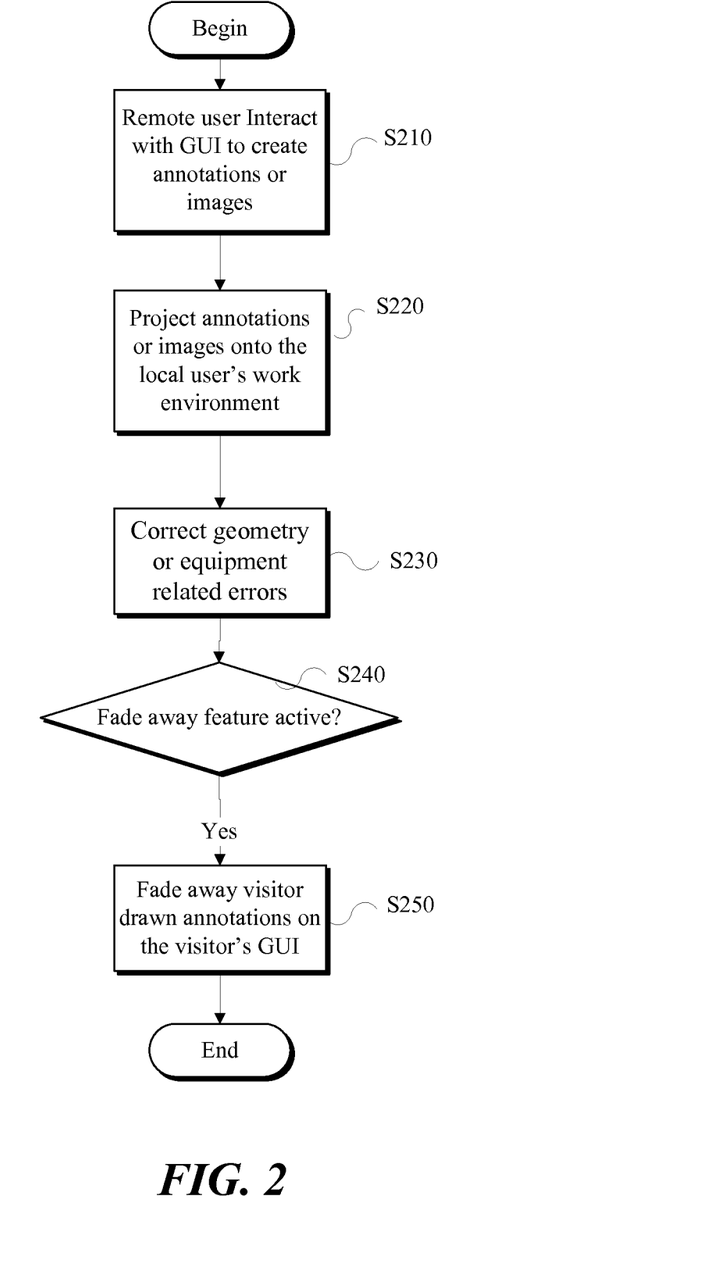
FIG. 2 is an exemplary flow diagram of a method of using the advisor system, in accordance with one embodiment.

Referring to FIG. 2, the remote visitor may interact with GUI 124 to create annotations or images (S210) that are ultimately projected onto the local user's physical work environment (S220). For the purposes of this specification, the terms "annotation" and "image" may be used interchangeably and without limitation may refer to text, drawings, graphics or other types of content. The GUI 124 may be configured to render a visitor environment comprising a view of the local user's physical work environment based on the images captured and communicated by the camera coupled to articulated arm 50. Features are provided to allow the visitor to interpret and augment an image of the local user's physical work environment displayed in the visitor's work environment and as a result the local user's physical work environment by, for example, introducing annotations onto the visitor work environment, which are then reproduced at the local user's physical work environment.

The visitor, using visitor application 122 may create annotations that are communicated to the projection mechanism on the articulated arm 50. The images may thus be physically rendered (e.g., projected by way of a Pico projector) onto the local user's physical work environment. In this manner, useful visual information including a pointer and annotations may be overlaid onto the local user's physical work environment, allowing the remote visitor and the local user 110 to interact much more effectively, as if the remote visitor is locally present. A calibration mechanism may be used to calibrate the projector and the positioning of the projected image on a surface of a target object. A position fine-tuning mechanism may be used to correct any geometry or equipment related errors (S230), allowing for an exact positioning of the annotations created by the visitor onto three dimensional physical surfaces in the local user's work environment.

In accordance with one or more embodiments, a visitor may use visitor application 122 to introduce annotations into GUI 124 in the visitor's work environment. The annotations may be rendered on a display screen viewed by the visitor at time T1 and rendered or projected onto the local user's physical work environment at time T2, for example, due to delays associated with data transmission over network 130. In one implementation, if a first feature (e.g., a fade away feature) is activated (S240), once the annotations are rendered or projected onto the local user's work environment at time T2, the annotations created or drawn on GUI 124 at time T1, as viewed by the visitor, are removed or faded away (S250).

Without the fade away feature, the annotations projected onto the local user's physical work environment that are transmitted back to the visitor GUI (e.g., via the camera positioned on articulated arm 50) may be confused with the visitor generated annotations in the GUI 124. The fade away feature, if active, optionally removes the visitor generated annotations and helps the visitor better appreciate the exact location where the annotations are rendered in the local user's physical work environment. Alternatively, instead of removing the annotations completely, the visitor generated annotations may be distinguished (e.g., displayed as dotted lines in the visitor's GUI 124).

The visitor and the local user may communicate over existing voice communication channels (e.g., an independent telephone line), during the remote assistance session. As noted earlier, optionally, advisor system 105 may be equipped with microphones and speakers and a communication interface to establish a two-way full-duplex audio channel with visitor computing system 120 over network 130. The local user may also use a display device (e.g., a tablet computing device, a smart phone, etc.) by which an image of the physical work environment as seen by the visitor via the GUI 124, along with any associated visitor generated annotations, may be viewable by the local user. This option may be used in case the image projected onto the local user's physical work environment is not sufficiently clear or in case certain images or information may be better communicated in that manner. In this latter instance, the fade away feature noted above may be deactivated.

The advisor system 105 may be developed in various sizes to scale with the scope and requirements of the user's physical environment. Optionally, the articulated arm 50 may be capable of wirelessly communicating with network 130 and may run on a battery operated energy source to increase utility and functionality of the articulated arm 50. In accordance with one embodiment, a simple implementation of the articulated arm 50 may include a base unit that allows for one or more degrees of freedom rotation and provisions for azimuth angle change of a first section of the articulated arm 50. Connected to the first section may be a second section having at least one degree of freedom elbow joint.

At the end of the second section may be one or more degrees of freedom wrist joint (e.g., a rotation and hinge joint) with a clamp unit that holds an optionally combined video camera and a projector assembly, for example. This configuration allows the local user to carry the advisor system 105 to the point of need in order to capture the relevant view of a target object being discussed or worked on. In this manner, a local user may carry on a voice conversation with the remote visitor while possibly having both hands free to work with the object. For example, the local user may gesture or point to parts of the target object while verbally asking a question. The remote visitor may enhance or simplify the verbal answer by annotating and marking the exact location that is relevant on the object utilizing the projection and annotations features as provided above.

Advantageously, the remote visitor may control the movements of the articulated arm 50 using a software application interface (e.g., visitor application 122) accessible at the remote location where the visitor is present. The articulated arm 50 movements may be mapped into two dimensions which the remote visitor may control the view of the target object from different positions and angles. The visitor may also zoom in (either by virtue of an optical zoom lens or by moving the camera closer to the object) to take a closer look at the object. As noted earlier, a stabilizing feature may be provided such that the annotations remain anchored to the initially intended locations in the user's physical environment despite the movement of the articulated arm 50 or a change in zoom.

In one embodiment, the stabilizing feature is implemented such that when zooming in or out or when moving the articulated arm 50, previously generated annotations that are projected onto a target surface or area do not move on the target object in the local user's environment as a consequence of the articulated arm 50 moving. In one embodiment, the annotations may be mapped to more than two variables for motion of the arm. Further, the articulated arm 50 may be mounted on a remotely controlled robot base unit (e.g., Pioneer 3-DX) so that the visitor may navigate around the local user's environment, with minimal or no assistance from the local user.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3:
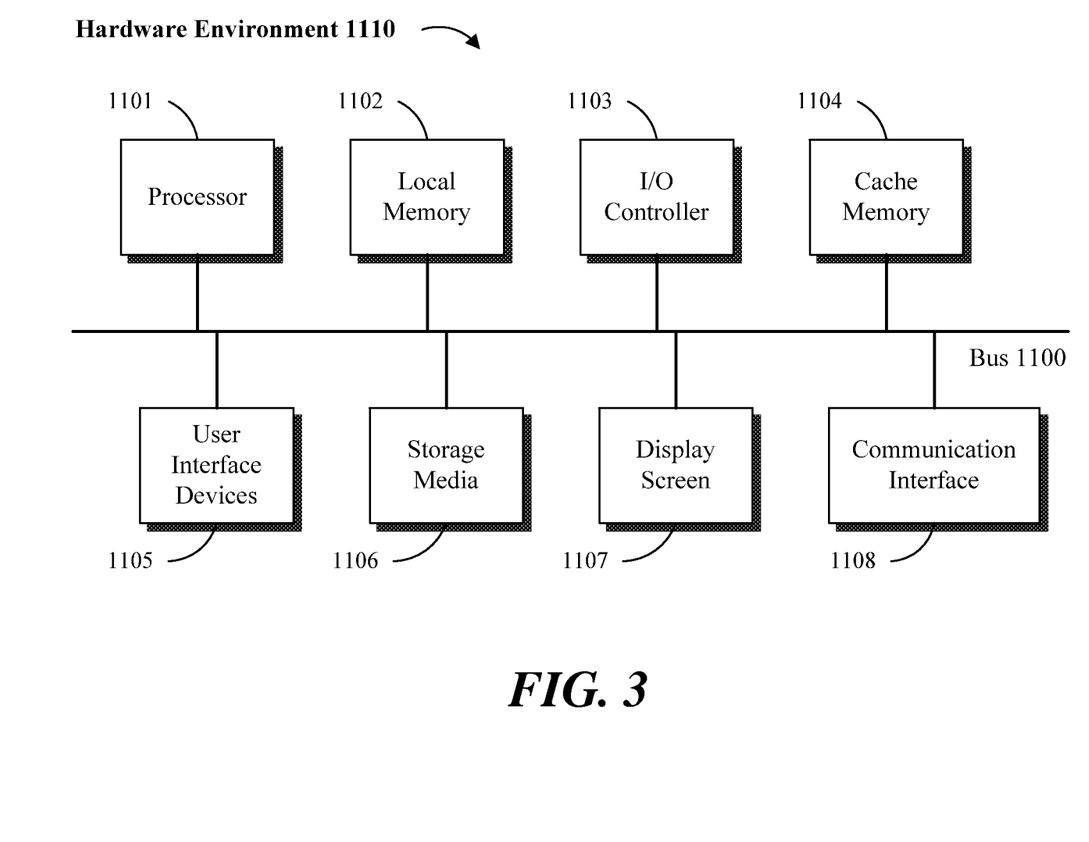
FIGS. 3 and 4 are block diagrams of hardware and software environments in which the disclosed systems and methods may operate, in accordance with one or more embodiments.
Figure 4:
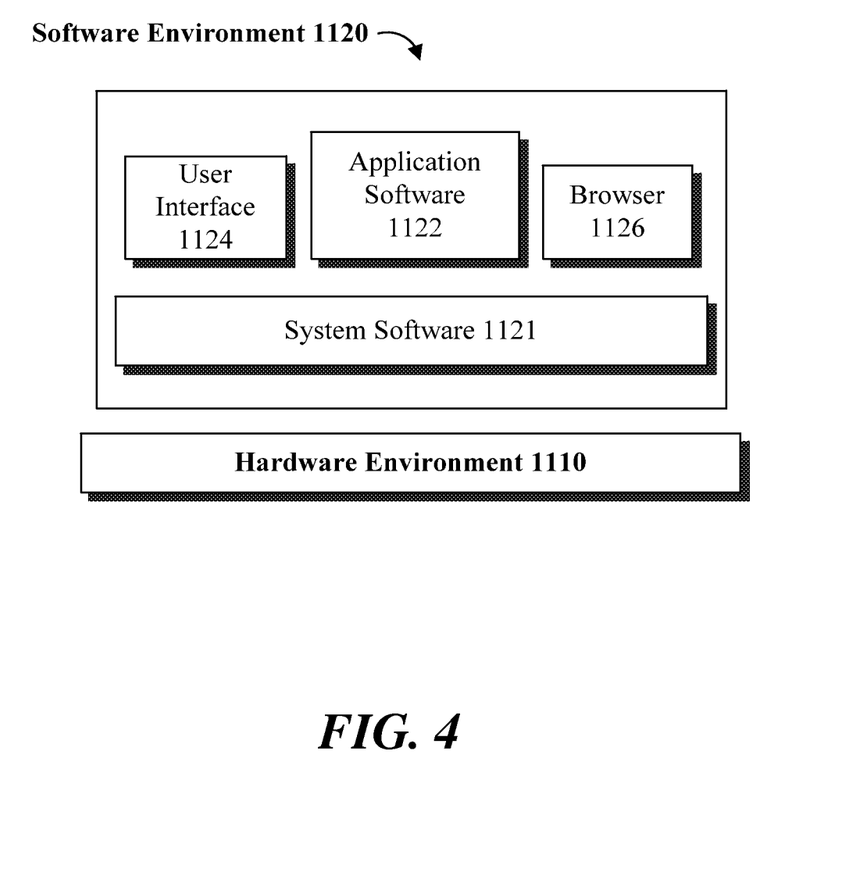

Referring to FIGS. 3 and 4, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter.

Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information.

Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for providing remote assistance, the method comprising:
   establishing a communications session between a local user and a visitor over a communications network, wherein the local user is positioned in a local physical operating environment and the visitor is positioned in a remote location relative to the local physical operating environment;
   communicating audio or video data captured at the local physical operating environment to the visitor; and
   receiving, at the local physical operating environment, imaging data generated as a result of the visitor interacting with a visitor application running on a visitor computing device, wherein the imaging data is used to project, by way of a projector, a first image of one or more annotations created by the visitor onto a local physical work environment to assist the local user,
   wherein the projector is mounted on a mechanically articulated arm, wherein the mechanically articulated arm is controllable by the visitor, to allow the visitor to control positioning of the first image in the local physical work environment; and wherein control data generated as a result of the visitor interacting with a control unit at the remote location is communicated to the articulated arm to change the position of the articulated arm in the local physical operating environment; and wherein a camera is positioned in an operational relationship with the mechanically articulated arm to capture video data of a target object in the local physical work environment; and wherein the captured video data is transmitted over the communications network to a visitor computing system, wherein the visitor application is executed over the visitor computing system to render a graphical user interface (GUI) on a display screen based on the captured video data; and wherein the GUI provides the visitor with a view of the local physical environment and option to create the one or more annotations in the GUI; and wherein image data associated with the visitor created annotations in the GUI are communicated over the communications network from the visitor computing system to the projector, wherein the projector uses the image data to project the first image of the annotations onto a first portion of the target object; and wherein a first feature is activated to render the one or more annotations created by the visitor in the GUI with dotted lines, after the first image of the annotations is projected onto the first portion of the target object.

2. The method of claim 1, wherein the visitor using the control unit maneuvers the camera to a position to view a second portion of the target object.

3. The method of claim 2, wherein a stabilizer is utilized to maintain the position of the first image projected on the first portion of the target object when the camera is maneuvered to view a second portion of the target object.

4. The method of claim 1, wherein a display unit is provided to the local user to view the one or more annotations created by the visitor in the GUI.

5. A system for providing remote assistance, the system comprising:
   a communication interface for establishing a communications session between a local user and a visitor over a communications network, wherein the local user is positioned in a local physical operating environment and the visitor is positioned in a remote location relative to the local physical operating environment;
   a logic unit for communicating audio or video data captured at the local physical operating environment to the visitor; and
   a logic unit for receiving, at the local physical operating environment, imaging data generated as a result of the visitor interacting with a visitor application running on a visitor computing device;
   a projector for projecting the imaging data comprising a first image of one or more annotations created by the visitor onto a local physical work environment to assist the local user,
   a mechanically articulated arm in operational relationship with the projector, wherein the mechanically articulated arm is controllable by the visitor, to allow the visitor to control positioning of the first image in the local physical work environment; and wherein control data generated as a result of the visitor interacting with a control unit at the remote location is communicated to the articulated arm to change the position of the articulated arm in the local physical operating environment; and wherein a camera is positioned in an operational relationship with the mechanically articulated arm to capture video data of a target object in the local physical work environment; and wherein the captured video data is transmitted over the communications network to a visitor computing system, wherein the visitor application is executed over the visitor computing system to render a graphical user interface (GUI) on a display screen based on the captured video data; and render the one or more annotations created by the visitor in the GUI with dotted lines, after the first image of the annotations is projected onto the first portion of the target object.

6. The system of claim 5, wherein the GUI provides the visitor with a view of the local physical environment and option to create the one or more annotations in the GUI.

7. A computer program product comprising a non-transitory computer readable storage medium having a computer readable program, wherein the computer readable program when executed on a computer causes the computer to:
   establish a communications session between a local user and a visitor over a communications network, wherein the local user is positioned in a local physical operating environment and the visitor is positioned in a remote location relative to the local physical operating environment;

communicate audio or video data captured at the local physical operating environment to the visitor; and receive, at the local physical operating environment, imaging data generated as a result of the visitor interacting with a visitor application running on a visitor computing device, wherein the imaging data is used to project, by way of a projector, a first image of one or more annotations created by the visitor onto a local physical work environment to assist the local user, wherein the projector is mounted on a mechanically articulated arm, wherein the mechanically articulated arm is controllable by the visitor, to allow the visitor to control positioning of the first image in the local physical work environment; and wherein control data generated as a result of the visitor interacting with a control unit at the remote location is communicated to the articulated arm to change the position of the articulated arm in the local physical operating environment; and wherein a camera is positioned in an operational relationship with the mechanically articulated arm to capture video data of a target object in the local physical work environment; and wherein the captured video data is transmitted over the communications network to a visitor computing system, wherein the visitor application is executed over the visitor computing system to render a graphical user interface (GUI) on a display screen based on the captured video data and render the one or more annotations created by the visitor in the GUI with dotted lines, after the first image of the annotations is projected onto the first portion of the target object.

8. The computer program product of claim 7, wherein the GUI provides the visitor with a view of the local physical environment and option to create the one or more annotations in the GUI.

* * * * *